(12) United States Patent
Wilson et al.

(10) Patent No.: US 9,274,914 B2
(45) Date of Patent: Mar. 1, 2016

(54) SYSTEM AND METHOD FOR PRESENTING ALERT NOTIFICATIONS FOR MASTER AND SLAVE DEVICES IF IN IDLE OPERATIONAL STATES

(75) Inventors: Michael R. Wilson, Corvallis, OR (US); Philip W. Manijak, Corvallis, OR (US); Theodore E. Ransom, Corvallis, OR (US); Roland Penny, Solihull (GB); Adam J. Bernosky, Corvallis, OR (US); Martin Schwarz, Passau (DE)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 995 days.

(21) Appl. No.: 12/841,761

(22) Filed: Jul. 22, 2010

(65) Prior Publication Data

US 2012/0023269 A1 Jan. 26, 2012

(51) Int. Cl.
*G06F 13/00* (2006.01)
*G06F 11/30* (2006.01)

(52) U.S. Cl.
CPC ........ *G06F 11/3013* (2013.01); *G06F 11/3055* (2013.01)

(58) Field of Classification Search
CPC .................. G06F 11/3013; G06F 11/3055
USPC ................. 710/15–19; 235/375, 381; 705/1.1
See application file for complete search history.

(56) References Cited

U.S. PATENT DOCUMENTS

| | | | |
|---|---|---|---|
| 5,983,197 A * | 11/1999 | Enta | G06Q 10/04 235/379 |
| 7,177,962 B2 * | 2/2007 | Seto | 710/38 |
| 7,257,200 B2 | 8/2007 | Valeriano et al. | |
| 7,277,967 B2 * | 10/2007 | Kao et al. | 710/18 |
| 7,304,753 B1 | 12/2007 | Richter et al. | |
| 7,330,913 B1 * | 2/2008 | Dahneke et al. | 710/15 |
| 7,577,571 B2 * | 8/2009 | Yui | 705/1.1 |
| 8,138,934 B2 * | 3/2012 | Veillette et al. | 340/635 |
| 2002/0075149 A1 * | 6/2002 | Goodwin, III | G07F 19/207 340/540 |
| 2003/0048469 A1 | 3/2003 | Hanson | |
| 2003/0055876 A1 * | 3/2003 | Korala | G06Q 30/0601 709/203 |
| 2004/0105122 A1 | 6/2004 | Schaeffer | |
| 2005/0137916 A1 * | 6/2005 | McElhannon | 705/5 |
| 2007/0279668 A1 | 12/2007 | Czyszczewski et al. | |
| 2008/0278754 A1 * | 11/2008 | Hibino | G06F 3/1204 358/1.15 |
| 2009/0051507 A1 | 2/2009 | Outlaw et al. | |

FOREIGN PATENT DOCUMENTS

JP 09035129 * 2/1997

OTHER PUBLICATIONS

ZebraNet™ Bridge Enterprise Printer Management Software, Web Page, 2pgs., www.zebra.com/printermanagement.

* cited by examiner

*Primary Examiner* — Tammara Peyton (74) *Attorney, Agent, or Firm* — HP Inc-Patent Department (57) ABSTRACT

A method for presenting alert notifications includes identifying an alert condition for one of a master device, a slave device, and a production device. Operational states of the slave device and the master device are determined. For each of the slave device and the master device, upon a determination that the given device is in an idle state, that device is caused to display a notification corresponding to the identified alert condition.

20 Claims, 8 Drawing Sheets

SYSTEM AND METHOD FOR PRESENTING ALERT NOTIFICATIONS FOR MASTER AND SLAVE DEVICES IF IN IDLE OPERATIONAL STATES

BACKGROUND

Systems of devices such as kiosks are deployed in public environments such as department stores. The kiosks are used by customers to order products. Photographic prints are just one such product example. In many instances the kiosks are managed by employees of the environment in which they are deployed. From time to time, conditions related to the operation of the kiosks can arise that call for an employee's attention. Example conditions include a kiosk's credit card reader malfunctioning or its receipt printer being low on paper. Using the photographic prints example, other conditions may include a photo printer being offline or low on paper. Employees, who are often busy completing other tasks, are often unaware when such conditions arise. When aware, the employees are not able to discern if the condition calls for their immediate attention or if it can be addressed later.

DETAILED DESCRIPTION

Introduction: Various embodiments described below operate to present alert notifications. When implemented in an environment of interconnected product ordering stations, an individual tasked with monitoring the stations can be signaled to an alert condition calling for attention. Further, characteristics of the particular alert notification presented can correspond to a severity of the alert condition. As a result, the individual monitoring the stations can discern those alert conditions that call for immediate attention from those that do not.

The following description is broken into sections. The first, labeled "Environment," describes exemplary environments in which embodiments may be implemented. The second section, labeled "Components," describes physical and logical components of various embodiments. The last section, labeled "Operation," describes steps taken to implement various embodiments.

Figure 1:
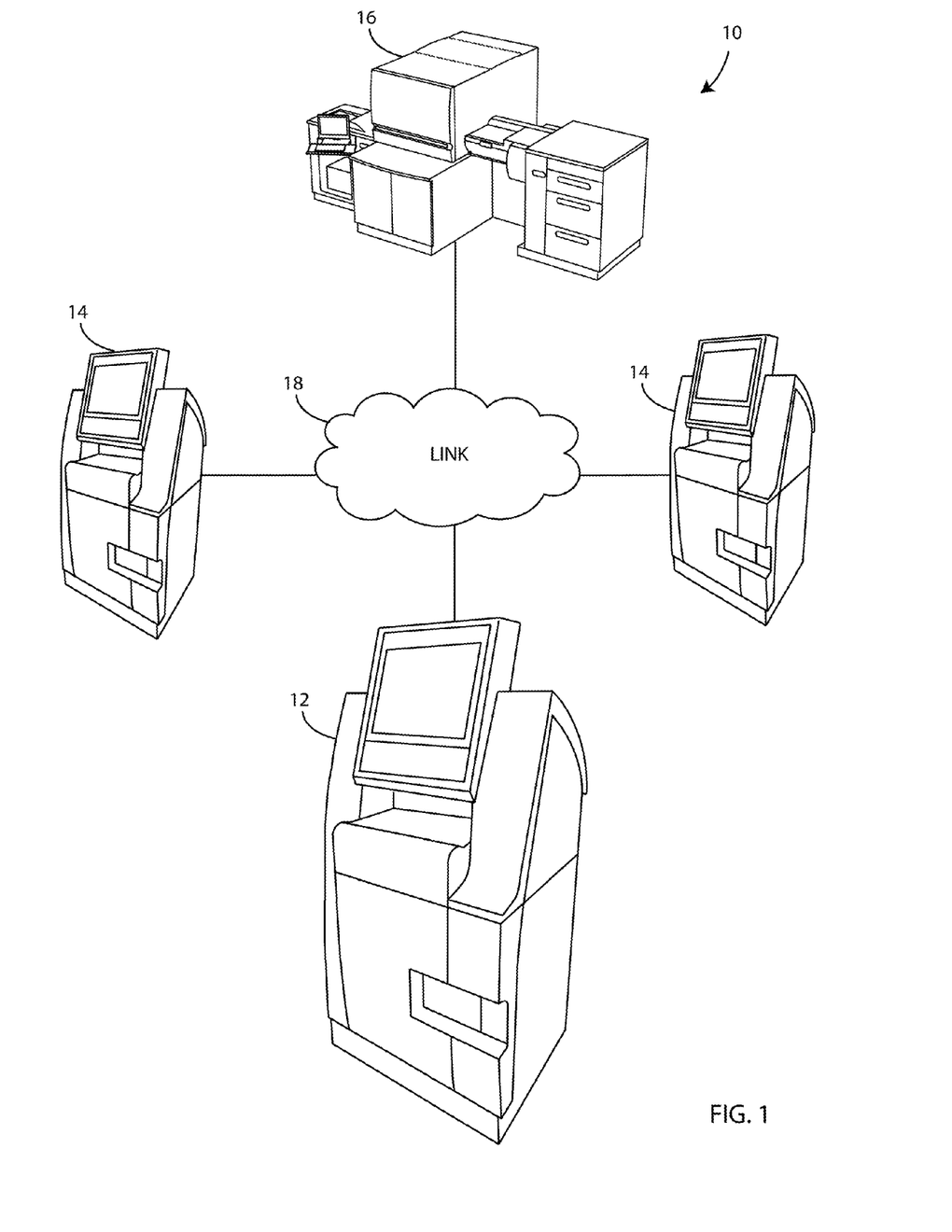
FIG. 1 depicts an exemplary environment in which embodiments may be implemented.

Environment: FIG. 1 depicts an exemplary environment 10 in which embodiments may be implemented. Environment 10 includes master device 12, slave devices 14, and production device 16 interconnected via link 18. While environment 10 is shown to include two slave devices 14 and one production device 16, environment 10 can include any number of such devices. Devices 12 and 14 each represent a computing device with which individuals can interact to perform tasks such as ordering products. Master device 12 is configured for additional tasks such as processing orders taken by itself and slave devices 14 as well as monitoring the operational status of all devices 12-16. In the example of FIG. 1, devices 12 and 14 are depicted as kiosks. The terms master and slave are used only to distinguish additional functionality provided by master device 12. In particular, that additional functionality relates to the additional tasks of processing orders taken and monitoring operational status of all devices 12-16.

Production device 16 represents generally any device or devices for producing products ordered through devices 12 and 14. Such products can include photographic prints, electronic recordings, books, and any number of other items. In the example of FIG. 1, production device 16 is shown as a printer for producing photographs, documents, or any other printed images. Link 18 represents generally one or more of a cable, wireless, fiber optic, or remote connection via a telecommunication link, an infrared link, a radio frequency link, or any other connector or system that provides electronic communication. Link 18 may represent an intranet, the Internet, or a combination of both. The paths followed by link 20 between devices 12-16, as depicted in FIG. 1, represent the logical communication paths between these devices, not necessarily the physical paths between the devices.

Figure 2:
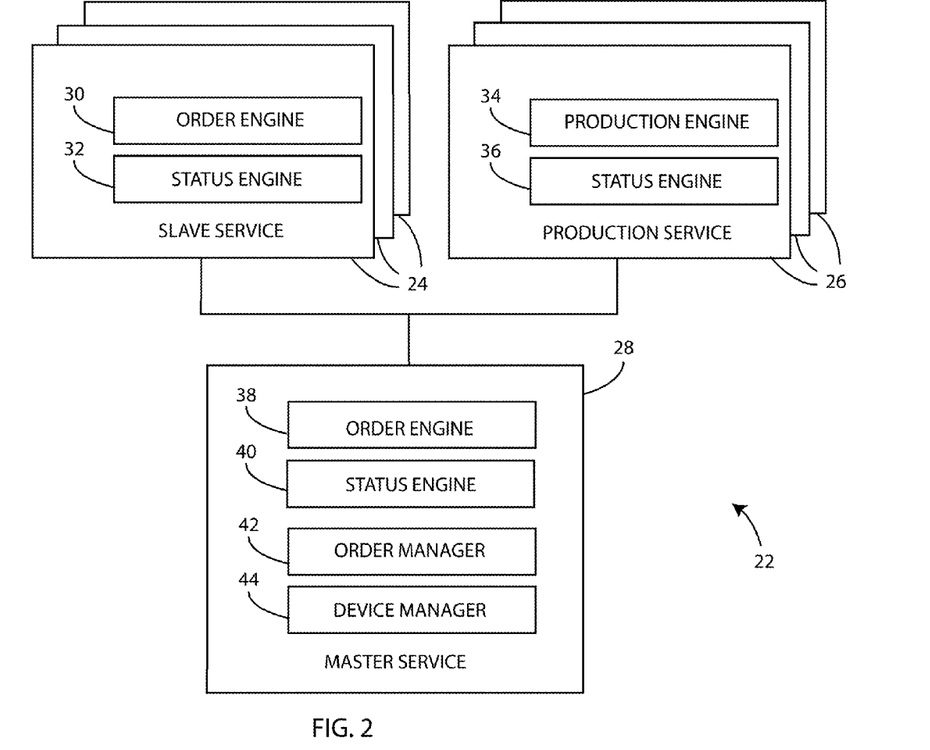
FIG. 2 depicts a product ordering system according to an embodiment.

Components: FIG. 2 is a block diagram depicting physical and logical components that function as a product ordering system 22 in which embodiments may be implemented. System 22 includes slave services 24, production services 26, and master service 28. Looking back to FIG. 1, each slave service 14 may be implemented via or with respect to a slave device 14. Each production service 26 may be master service may be implemented via or with respect to a production service 16. Master service 28 may be implemented via or with respect to master device 12. While FIG. 2 depicts three slave services 24, three production services 26, and one master service 28, system 22 may include any number of services 24, 26 and 28. In the example of FIG. 1, the various components of each service 24, 28, and 28 may be implemented via a corresponding device 12, 14, or 16 or they may be distributed across those devices or other devices not depicted.

Each slave service 24 is shown to include order engine 30 and status engine 32. Order engine 30 represents generally any combination of hardware and programming for receiving user orders for products and communicating those orders to receiving a user's order for a product entered through a device such as slave device 14 of FIG. 1. In a given implementation, order engine 30 is responsible for causing a slave device to display content for selecting product options. When the slave device is idle, order engine 30 may cause the display of attraction content, discussed below. Further, order engine 30 may also be responsible for causing the slave device to display notifications at the direction of master service 28.

Status engine 32 represents generally any combination of hardware and programming for monitoring and reporting the status of a device, such as slave device 14, to master service 28. The reported status information can be used to identify the operation state of a device as well the operational status of various device components. Looking ahead to the example of FIG. 4, slave device 14 may have an active or an idle operational state. Further, slave device 14 is shown to include various components whose operational status may be monitored. The proper operation of those components allows product orders to be entered through slave device 14.

Referring again to FIG. 2, each production service 26 is shown to include production engine 34 and status engine 36. Production engine 34 represents generally any combination of hardware and programming for receiving a job from master service 28 and causing a device, such as production device 16 of FIG. 1, to process that job to produce a product. For example, such a job may be a print job for a set of photographic prints, and production device 16 may be a photo printer. In another example, the job may relate to the archival of electronic files, and production device 16 may be a CD or DVD Rom replicator. Status engine 36 represents generally any combination of hardware and programming for monitoring and reporting the status of a device, such as production device 16, to master service 28. Looking ahead to the example of FIG. 4, each production device 16 is shown to include various components whose status may be monitored. The proper operation of those components allows product orders to be fulfilled by the given production device 16.

Master service 28 is shown to include order engine 38, status engine 40, order manager 42, and device manager 44. Order engine 38 represents generally any combination of hardware and programming for receiving user orders for products and communicating those orders to receiving a user's order for a product entered through a device such as master device 12 of FIG. 1. In a given implementation, order engine 38 is responsible for causing a master device to display content for selecting product options. When the master device is idle, order engine 38 may cause the display of attraction content, discussed below. Further, order engine 38 may also be responsible for causing the master device to display notifications at the direction of device manager 44.

Status engine 38 represents generally any combination of hardware and programming for monitoring and reporting the status of a device, such as master device 12, to device manager 44. The reported status information can be used to identify the operation state of a device as well the operational status of various device components. Looking ahead to the example of FIG. 4, master device 12 may have an active or an idle operational state. Further, master device 12 is shown to include various components whose operational status may be monitored. The proper operation of those components allows product orders to be entered through master device 12.

Figure 3:
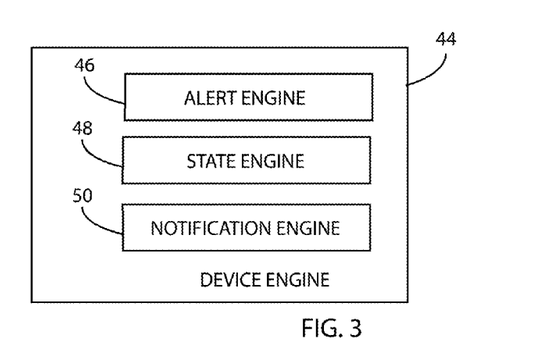
FIG. 3 depicts a device engine of FIG. 2 according to an embodiment.

Continuing with FIG. 2, order manager 42 represents generally any combination of hardware and programming for collecting product orders from order engines 30 and 38, processing those orders, and delivering corresponding jobs to production services 26. Those jobs can then be processed to produce the ordered products. Device manager 44, discussed in more detail below with respect to FIG. 3, represents generally any combination of hardware and programming for receiving device status reports from status engines 32, 36, and 40. Device manager 44 processes those reports and causes devices, such as master and slave devices 12 and 14 of FIG. 1, to present corresponding alert notifications.

Moving to FIG. 3, device manager 44 is shown to include alert engine 46, state engine 48, and notification engine 50. Alert engine 46 represents generally any combination of hardware and programming for identifying an alert condition for one of a master device, a slave device, and a production device. An alert condition is a condition indicating that a device has a condition that calls for or is predicted to call for intervention. In the example of FIG. 1, for production device 16, such intervention may involve replacing consumables such as paper and colorant for a printer or DVD or CD ROMS for a replicator. intervention can also involve clearing device jams and placing a device in an on-line state. For master and slave devices 12 and 14, intervention can include repairing components used for ordering such as receipt printers and credit card readers.

State engine 48 represents generally any combination of hardware and programming for determining operational states of the slave device and of the master device. A device can be in one of an idle and an active state. A master or slave device is in an active state when being used to enter an order for a product. A device is in an idle state when it is not being used to enter such an order. Referring back to FIG. 2, status engines 32, 36, and 40 report status information to device manager 44. As discussed, that status information can identify the operational state of a given device as being idle or active.

Notification engine 50 represents generally any combination of hardware and programming for causing master and slave devices to display a notification corresponding to an alert condition identified by alert engine 46 upon a determination by state engine 48 that the given device is in an idle state. When in an idle state, a device may be displaying attraction content. Attraction content is visual content used to impart information to a viewer but is not used for directly ordering a product. For example, attraction content may be an advertisement or other content indented to catch the attention of an individual within visual range of a master or slave device. Such content may include a still image, a series of still images, or motion video. In causing the presentation of the alert notification, notification engine 50 causes the notification to be displayed such that it does not disrupt a display of attraction content. In this manner, a store employee responsible for monitoring devices can be made aware of an alert condition without alarming store customers.

In performing its tasks, alert engine 46 may be responsible for determining a severity of an identified alert condition. An alert condition that does not prevent the immediate use of a device will have a lower severity than an alert condition that does. For example, a production device that is low on consumables may have an alert status that is less severe than a production device that is out of a given consumable needed to produce a product. In light of a determined severity of an alert condition, notification engine 50 may cause a display of a notification having a visual characteristic that corresponds to the severity. For example, a notification may that the form of a frame positioned around attraction content. The frame may have a color or pattern that corresponds to the severity.

In other situations, state engine 48 may determine that a master device or slave device is in an active state. In an active state, a device may be displaying content in the form of user accessible controls through which a user can select product options. A given alert condition may prevent the selection of such product options or otherwise prevent a product form being produced with a given option. Notification engine 50, then, may also be responsible for limiting the display of content for selecting production options according to the identified alert condition. For example, a production device such as a printer may be out of paper of a certain size. Notification engine 50 would then prevent a device from displaying a control such as a check box allowing a user to select paper of that size. Or notification engine 50 may cause the display of a warning indicating the likelihood of a delayed delivery of a product ordered using that option. In the case an alert condition prevents the use of a slave device or master device to order any products, notification engine 50 may cause the display of a lock out screen upon a determination that the given device is in an active state. Such a determination may be made upon an attempt to use the device.

Figure 4:
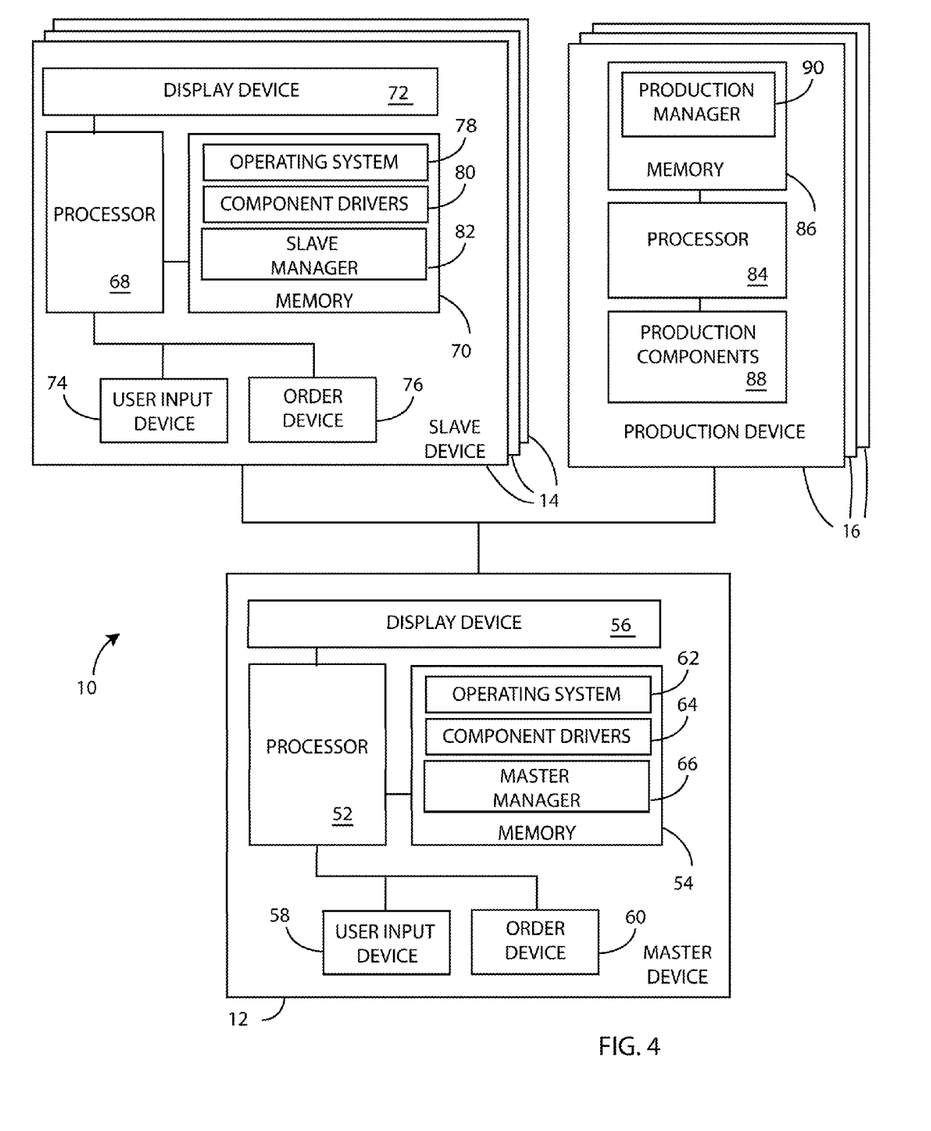
FIG. 4 is a block diagram of an environment in which the system of FIG. 2 may be implemented.

As mentioned, system 28 of FIG. 2 may be implemented in environment 10 of FIG. 1. FIG. 4 is a block diagram depiction of environment 10. In the example of FIG. 4, master device 12 is shown to include processor 52, memory 54, display device 56, user input device 58, and order device 60. Processor 52 represents generally any device capable of executing program instructions stored in memory 54. Memory 54 represents generally any memory configured to store program instructions (programming) and other data. Display device 56 represents generally any display device capable of displaying a graphical user interface at the direction of processor 52. User input device 58 represents generally any device such as a mouse, keyboard, or a touch screen through which a user can interact with a user interface presented via display device 56. Order device 60 represents generally any other device used to initiate, place, or complete and order for a product. For example, order device 60 may include a receipt printer and a credit card reader.

Memory 54 is shown to include operating system 62, component drivers 64, and master manager 66. Operating system 62 represents generally any software platform on top of which other programs or applications such as component drivers 64 and master manager 66 run. Examples include Linux® and Microsoft Windows®. Component drivers 64 represent programs for controlling the operation of components 56, 58, and 60. In particular, component drivers 64 translate generic commands into device specific commands capable of being utilized by components 56, 58, and 60. Master manager 62 represents generally any programming that, when executed by processor 52, implements the functionality of master service 28 of FIG. 2.

Slave device 14 is shown to include processor 68, memory 70, display device 72, user input device 74, and order device 76. Processor 68 represents generally any device capable of executing program instructions stored in memory 70. Memory 70 represents generally any memory configured to store program instructions (programming) and other data. Display device 72 represents generally any display device capable of displaying a graphical user interface at the direction of processor 68. User input device 74 represents generally any device such as a mouse, keyboard, or a touch screen through which a user can interact with a user interface presented via display device 72. Order device 76 represents generally any other device used to initiate, place, or complete an order for a product. For example, order device 76 may include a receipt printer and a credit card reader.

Memory 70 is shown to include operating system 78, component drivers 80, and slave manager 82. Operating system 78 represents generally any software platform on top of which other programs or applications such as component drivers 80 and slave manager 82 run. Examples include Linux® and Microsoft Windows®. Component drivers 80 represent programs for controlling the operation of components 72, 74, and 76. In particular, component drivers 80 translate generic commands into device specific commands capable of being utilized by components 72, 74, and 76. Slave manager 78 represents generally any programming that, when executed by processor 68, implements the functionality of slave service 24 of FIG. 2.

Production device 16 is shown to include memory 86, processor 84, and production components 88. Processor 84 represents generally any device capable of executing program instructions stored in memory 90. Memory 90 represents generally any memory configured to store program instructions (programming) and other data. Production components 88 represent generally components for producing a product under the direction of processor 84. For example, where production device 16 is a printer, production components 88 represent the components for dispensing colorant onto a print medium in the form of a desired image. Memory 86 is shown to include production manager 90. Production manager 90 represents any programming that, when executed by processor 84, implements the functionality of production service 26 of FIG. 2.

As noted above, the various components of system 22 of FIG. 2 include combinations of hardware and programming. With respect to FIG. 4, the hardware components may be implemented though processors 52, 68, and 84. The programming elements may be implemented via master manager 62, slave manager 78, and production manager 90.

Figure 5:
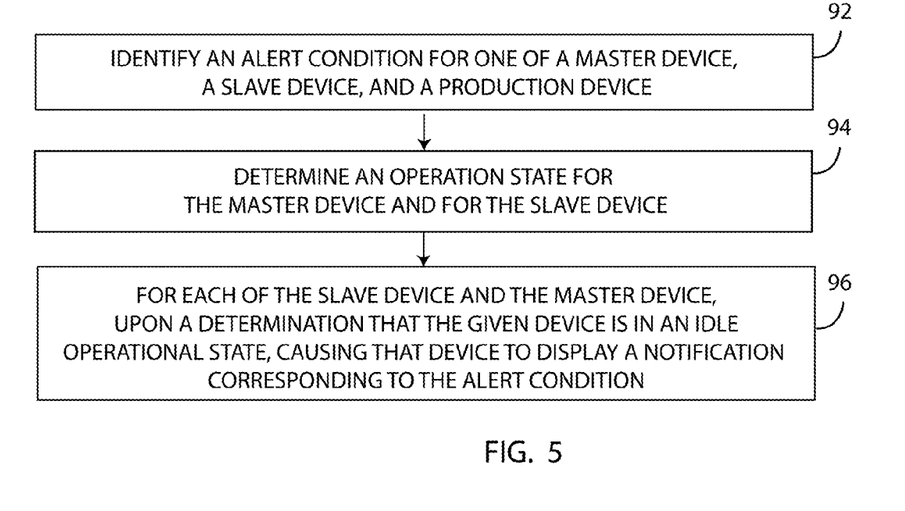
FIGS. 5-6 are flow diagram depicting steps take to implement various embodiments.
Figure 6:
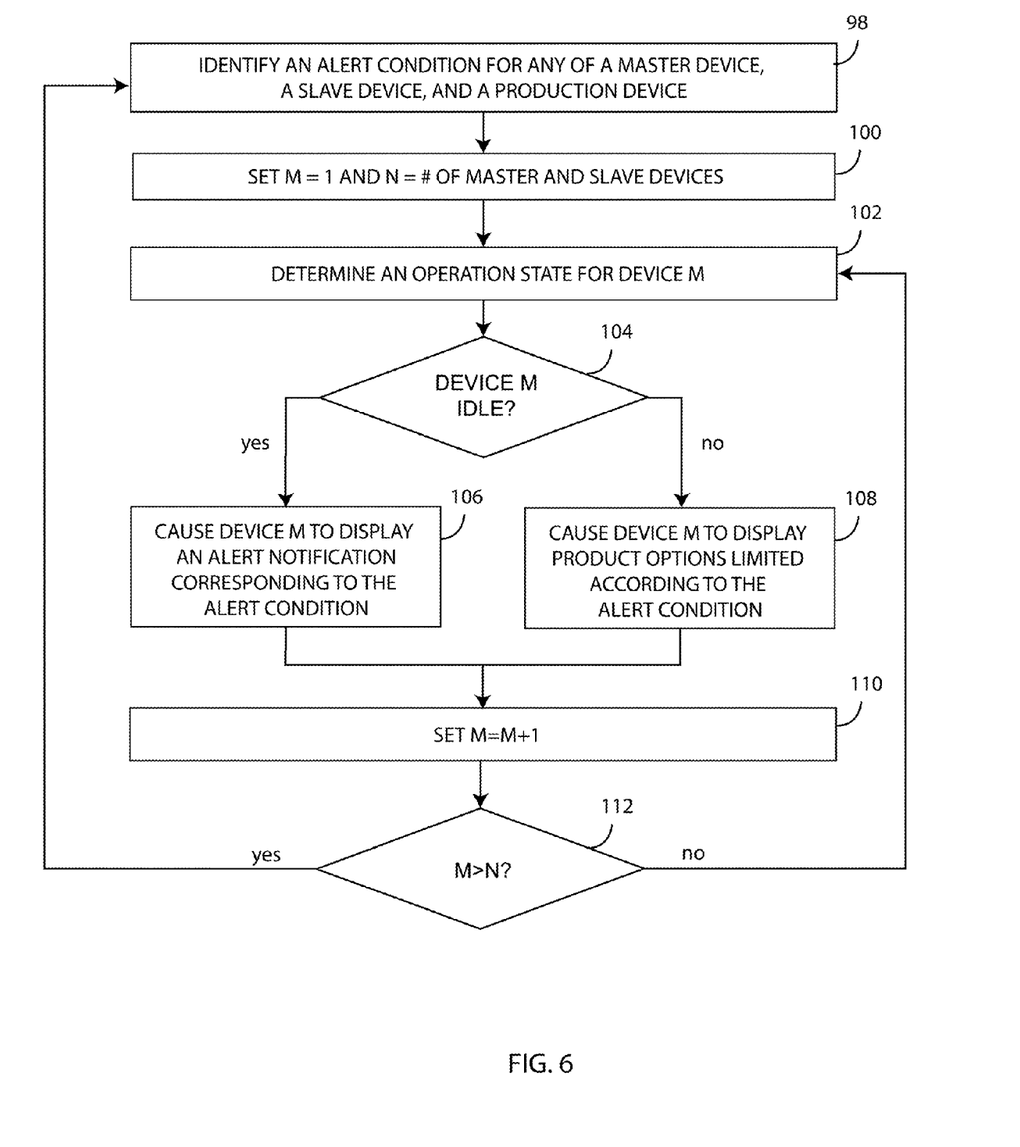
Figure 7:
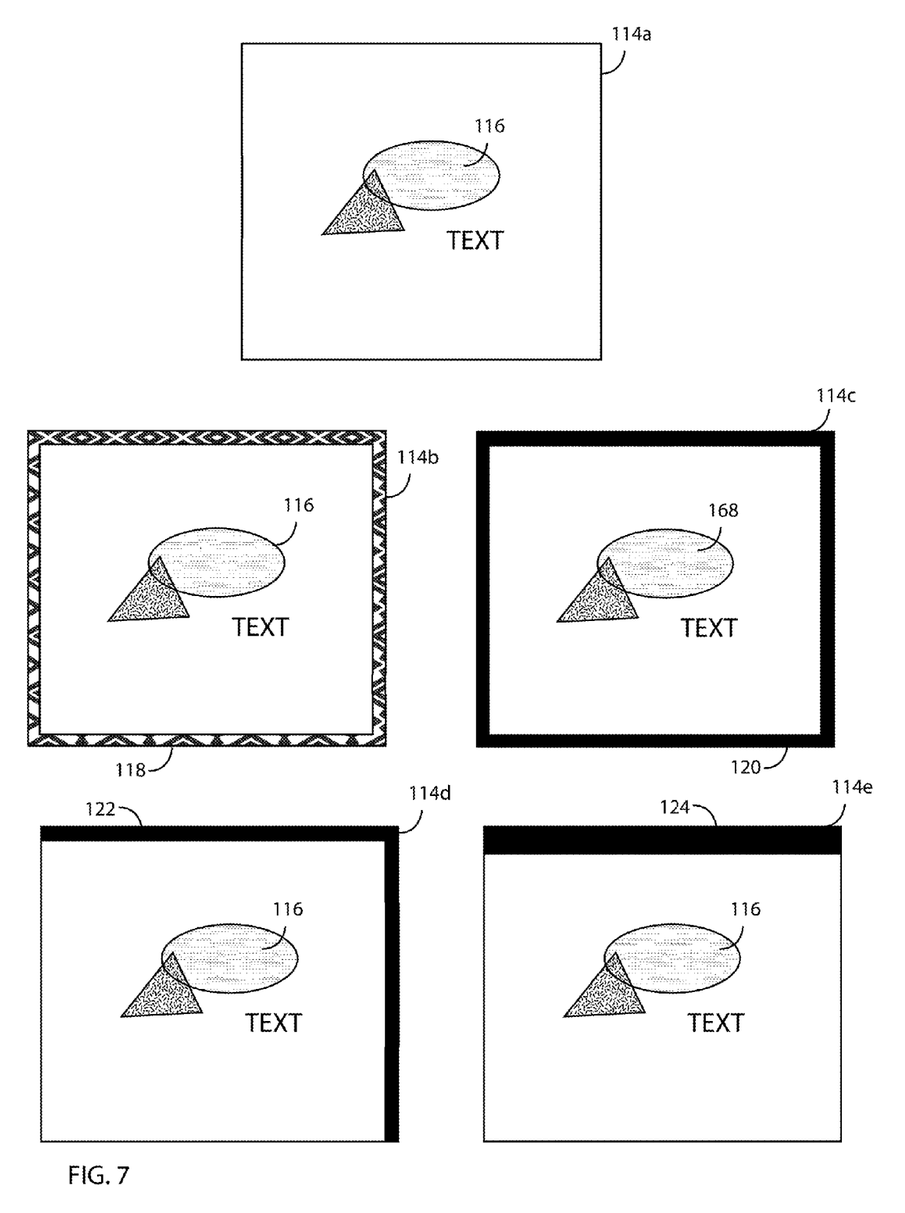
FIGS. 7-9 depict exemplary screen views of a user interface according to embodiments.
Figure 8:
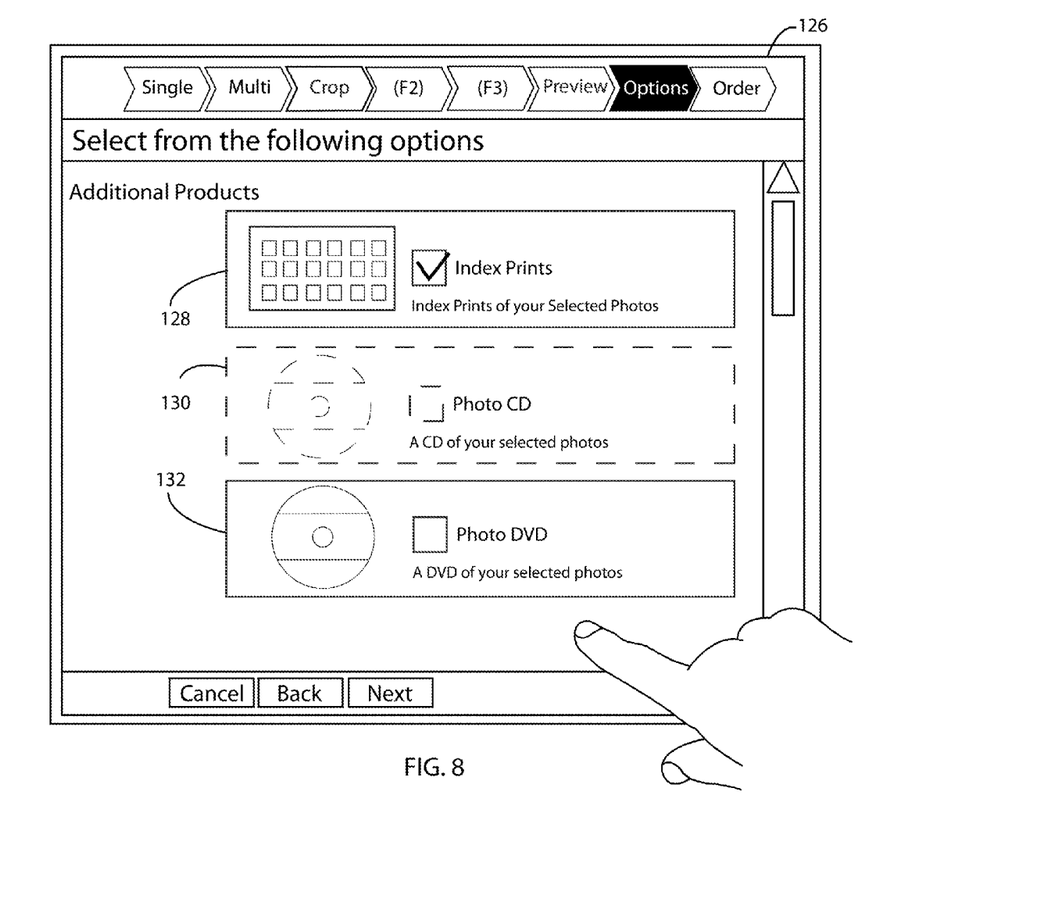
Figure 9:
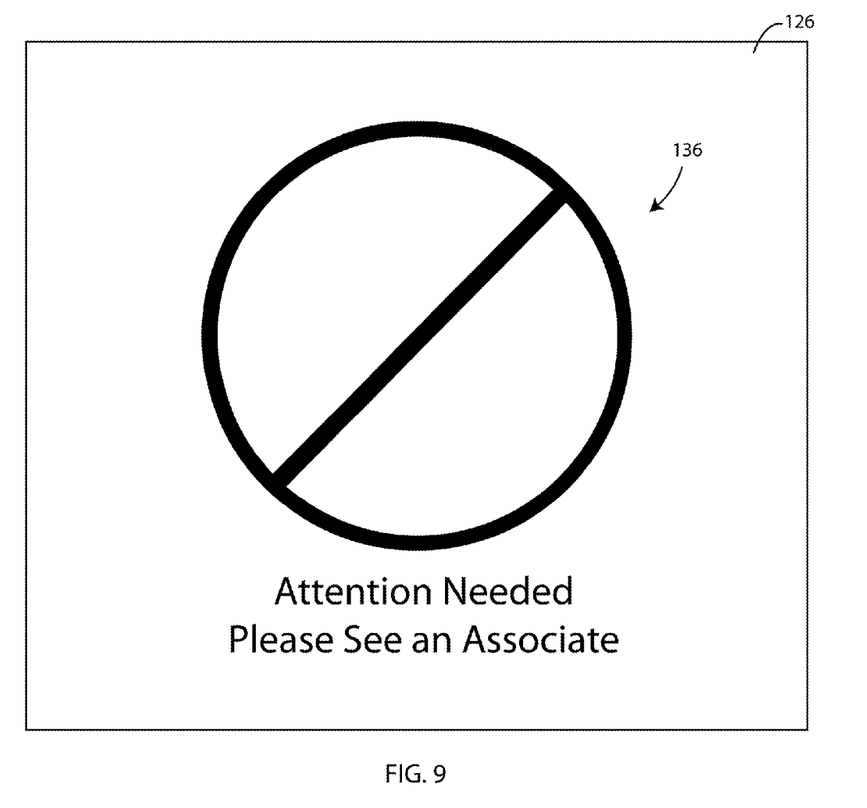

Operation: FIGS. 5-6 are flow diagrams of steps taken to implement various embodiments. FIG. 7 depicts screen display examples of alert notifications presented according to various embodiments. FIG. 8 depicts a screen display example in which content for selecting product options has been limited. FIG. 9 depicts a screen display example of a lock out screen. In discussing FIGS. 5-9, reference may be made to the diagrams of FIGS. 1-4 to provide contextual examples. Implementation, however, is not limited to those examples.

Starting with FIG. 5, an alert condition for one of a master device, a slave device, and a production device is identified (step 92). As noted, an alert condition is a circumstance indicating that a device has a condition that calls for or is predicted to call for intervention to resolve. Referring to FIG. 3, alert engine 46 may be responsible for implementing step 92. FIGS. 1 and 4 depict examples of master, slave, and production devices. In performing its function, alert engine 92 may determine a severity of the condition. Conditions that prevent a device from being used are more severe than conditions that only limit the use of a device or that may prevent the use of a device in the future.

Continuing with FIG. 5, operational states for the master device and for the slave device are determined (step 94). Referring to FIG. 3, step 94 may be implemented by state engine 48. As described, master and slave devices are utilized to order products. The operation state of a given device may be an active state in which the device is being utilized or attempted to be utilized to order a product. The operational state may instead be idle in which case no attempt is currently being made to utilize the device to order a product. When in an idle operational state, the device may be displaying attraction content. When in an active state, the device may be displaying content for selecting product options.

For each of the slave device and the master device, upon a determination that the given device is in an idle state, that device is caused to display a notification corresponding to the alert condition identified in step 92 (step 96). Referring to FIG. 3, notification engine 50 may be responsible for implementing step 96. When a given device in an idle state and displaying attraction content, that device, in step 96, is caused to display the notification such as to not disrupt the display of the attraction content. Note that an alert condition may relate to a device that is in an active state. Thus, the notification related to an alert condition for that device is caused to be displayed by a different device or devices that are in an idle state. As noted, the identified alert condition may also have a corresponding severity level. In this case, step 96 may include displaying the notification such that it has a visual characteristic corresponding to the severity of the alert condition. For example, the characteristic may be a color or pattern indicative of the severity.

Moving on to FIG. 6, an alert condition for one of a master device, a slave device, and a production device is identified (step 98). As noted, an alert condition is a circumstance indicating that a device has a condition that calls for or is predicted to call for intervention to resolve. Referring to FIG. 3, alert engine 46 may be responsible for implementing step 98. FIGS. 1 and 4 depict examples of master, slave, and production devices. In performing its function, alert engine 92 may determine a severity of the condition. Conditions that prevent a device from being used are more severe than conditions that only limit the use of a device or that may prevent the use of a device in the future.

A variable (M) is set to equal one, and a variable (N) is set to equal the number of master and slave devices (step 100). The variable (M) represents a particular one of the master and slave devices. An operational state for device (M) is determined (step 102). Referring to FIG. 3, step 102 may be implemented by state engine 48. As described, master and slave devices are utilized to order products. The operational state of a given device may be an active state in which the device is being utilized or attempted to be utilized to order a product. The operational state may instead be idle in which case no attempt is currently being made to utilize the device to order a product. When in an idle state, the device may be displaying attraction content. When in an active state, the device may be displaying content for selecting product options.

It is determined if device (M) is in an idle state (step 104), upon a positive determination that device (M) is idle, that device is caused to display a notification corresponding to the alert condition identified in step 98 (step 106). Upon a negative determination, in step 104, device (M) is caused to display content for selecting product options limited according to the alert condition (step 108). Where the alert condition prevents device (M) from being utilized to order products, step 108 can include causing device (M) to display lock-out content. Lock-out content is content informing a user that the given device cannot currently be used to order products.

The variable (M) is incremented by one (step 110), and it is determined if the variable (M) exceeds the variable (N). Upon a positive determination, the process skips back to step 98. A positive determination in step 110 reflects that all master and slave devices have been considered in steps 102, 104, 106, and 108 following the identification of the alert condition. Upon a negative determination, the process skips back to step 102 to consider the next device (M).

FIG. 7 depicts screen displays 114*a*-114*e* each including attraction content 116. With respect to display 114*a*, no alert condition notification is presented. With respect to displays 114*b*-114*e*, each display includes an example of an alert notification caused to be displayed in steps 96 and 106 of FIGS. 5 and 6 respectively. Displays 114*b* and 114*c* include notifications 118 and 120. Each notification 118 and 120 is depicted as a visual frame that surrounds attraction content 116. Notification 118 is patterned while notification 120 is solid. The color or pattern style may, for example, be indicative of the severity of an alert condition leading the display of the given notification. As can be seen, the display of notifications 118 and 120 do not disrupt the display of attraction content. Displays 114*d* and 114*e* are examples of notifications 122 and 124 that partially frame attraction content 116.

FIG. 8 depicts a screen display 126 that includes content 128-132 for selecting product options. In this example, those product options relate to photo CD and DVD products. Display 126 provides an example in which content for selecting product options has been limited, in step 108 of FIG. 6, according to an alert condition. In this example, the alert condition may indicate that a production device responsible for producing photo CDs is not currently operational. Thus, content 130 related to a photo CD is not available for user selection. Here, content 130 is shown in broken lines. In another example, content 130 may be grayed out or eliminated from display 126 altogether. Where the alert condition corresponds to a master or slave device and is indicative of a condition that renders the device non-operational, content 128-132 that would otherwise be displayed by that same device when in an active state may be replaced with lock-out content 136 as depicted in FIG. 9.

Conclusion: FIG. 1 depicts an environment in which embodiments may be implemented. Implementation, however, is not so limited. FIGS. 2-4 aid in depicting the architecture, functionality, and operation of various embodiments. In particular, FIGS. 2-4 depict various physical and logical components that are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, embodiments can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 5-6 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A computer readable medium having processor executable instructions stored thereon, the instructions when executed cause the implementation of a method for presenting alert notifications, the method comprising:
   identifying an alert condition for one of a master device, a slave device, and a production device;
   determining an operational state of the slave device and of the master device;
   for each of the slave device and the master device, upon a determination that the given device is in an idle operational state, causing that device to display a notification corresponding to the identified alert condition.

2. The medium of claim 1, wherein
   determining an operational state comprises determining that one of the master device and the slave device is in an idle state displaying attraction content and that the other device is in an active state and not displaying attraction content;
   causing comprises causing the one of the master and slave devices determined to be in the idle state to display the notification without disrupting the display of the attraction content.

3. The medium of claim 2, wherein causing the one of the master and slave devices determined to be in the idle state to display the notification without disrupting the display of the attraction content comprises causing that device to display a frame around the attraction content.

4. The medium of claim 3, wherein the method includes identifying a severity level corresponding to the alert condition, and wherein causing that device to display a frame around the attraction content comprises causing that device to display a frame having a visual characteristic corresponding to the identified severity level.

5. The medium of claim 1, wherein:
   determining an operational state comprises determining that one of the master device and the slave device is in an idle state displaying attraction content and that the other device is in an active state and not displaying attraction content;
   identifying an alert condition comprises identifying an alert condition for the one of the master device and the slave device determined to be in the active state; and
   causing comprises causing the one of the master and slave devices determined to be in the idle state to display the notification without disrupting the display of the attraction content.

6. The method of claim 1, wherein:
   identifying an alert condition comprises identifying an alert condition for one of a master device, a plurality of slave device, and a production device;
   determining an operational state comprises determining an operational state of the master device and of each of the slave devices;
   for each of the plurality of slave devices and the master device, upon a determination that the given device is in an idle state, causing that device to display a notification corresponding to the identified alert condition.

7. The medium of claim 1, wherein:
   determining an operational state comprises determining that one of the master device and the slave device is in an active state and is displaying content for selecting product options;
   identifying an alert condition comprises identifying an alert condition for the one of the master device and slave devices determined to be in an active state; and
   the method including limiting the content for selecting product options according to the identified alert condition.

8. A method for presenting alert notifications, comprising:
   identifying an alert condition for one of a master device, a slave device, and a production device;
   determining an operational state of the slave device and of the master device;
   for each of the slave device and the master device, upon a determination that the given device is in an idle state, causing that device to display a notification corresponding to the identified alert condition.

9. The method of claim 8, wherein
   determining an operational state comprises determining that one of the master device and the slave device is in an idle state displaying attraction content and that the other device is in an active state and not displaying attraction content;
   causing comprises causing the one of the master and slave devices determined to be in the idle state to display the notification without disrupting the display of the attraction content.

10. The method of claim 9, wherein causing the one of the master and slave devices determined to be in the idle state to display the notification without disrupting the display of the attraction content comprises causing that device to display a frame around the attraction content.

11. The method of claim 10, wherein the method includes identifying a severity level corresponding to the alert condition, and wherein causing that device to display a frame around the attraction content comprises causing that device to display a frame having a visual characteristic corresponding to the identified severity level.

12. The method of claim 8, wherein:
   determining an operational state comprises determining that one of the master device and the slave device is in an idle state displaying attraction content and that the other device is in an active state and not displaying attraction content;
   identifying an alert condition comprises identifying an alert condition for the one of the master device and the slave device determined to be in the active state; and
   causing comprises causing the one of the master and slave devices determined to be in the idle state to display the notification without disrupting the display of the attraction content.

13. The method of claim 8, wherein:
   identifying an alert condition comprises identifying an alert condition for one of a master device, a plurality of slave device, and a production device;
   determining an operational state comprises determining an operational state of the master device and of each of the slave devices;
   for each of the plurality of slave devices and the master device, upon a determination that the given device is in an idle state, causing that device to display a notification corresponding to the identified alert condition.

14. The method of claim 8, wherein:
   determining an operational state comprises determining that one of the master device and the slave device is in an active state and is displaying content for selecting product options;
   identifying an alert condition comprises identifying an alert condition for the one of the master device and slave devices determined not to be in an idle state; and
   the method including limiting the content for selecting product options according to the identified alert condition.

15. A system for presenting alert notifications, comprising:
   an alert engine to identify an alert condition for one of a master device, a slave device, and a production device;
   a state engine to determine an operational state of the slave device and of the master device;
   a notification engine to, for each of the slave device and the master device, cause that device to display a notification corresponding to the identified alert condition upon a determination by the state engine that the given device is in an idle state.

16. The system of claim 15, wherein, upon the state engine determining that one of the master device and the slave device is in an idle state displaying attraction content and that the other device is in an active state and not displaying attraction content, the notification engine is configured to cause the one of the master and slave devices determined to be in the idle state to display the notification without disrupting the display of the attraction content.

17. The system of claim 16, wherein the notification engine is configured to cause the display of the notification without disrupting the display of the attraction content by causing a display of a frame around the attraction content.

18. The system of claim 17, wherein the alert engine is configured to determine a severity of the alert condition and the notification engine is configured to cause the display of the frame around the attraction content, the frame having a visual characteristic corresponding to the identified severity level.

19. The system of claim 15, wherein:
the alert engine is configured to identify an alert condition for one of a master device, a plurality of slave device, and a production device;
the state engine is configured to determine an operational state of the master device and of each of the slave devices;
the notification engine is configured to, for each of the plurality of slave devices and the master device, upon a determination that the given device is in an idle state, causing that device to display a notification corresponding to the identified alert condition.

20. The system of claim 15, wherein, upon identification of an alert condition for a particular one of the master device and the slave device determined to be in an active state displaying content for selecting product options, the notification engine is configured to limit the content for selecting product options according to the identified alert condition.

* * * * *